Patented Nov. 7, 1944

2,362,086

UNITED STATES PATENT OFFICE 2,362,086

VOLUME STABILIZED ACID ABSORBING RESIN

Robert J. Myers, Elkins Park, and John W. Eastes, Philadelphia, Pa., assignors to The Resinous Products & Chemical Company, Philadelphia, Pa., a corporation of Delaware No Drawing. Application August 26, 1941, Serial No. 408,326

18 Claims. (Cl. 260—9)

This invention relates to resins having high capacity for the absorption of acidic constituents from fluids and having but small tendency to swell during such absorption. The invention concerns the preparation of phenol-formaldehyde resins which have aminomethyl substituents and which are modified by reaction with a carbohydrate which reduces Fehling's solution or with a carbohydrate which yields reducing substances when heated in the reaction mixture of phenol, formaldehyde, and a non-aromatic amine.

Resins have recently been developed which have considerable capacity for the adsorption or absorption of ions and acidic constituents. As the absorbing capacity has been increased, it has been observed that considerable changes in volume of the resin bed occur during both absorption and regeneration. This change in volume is generally referred to as "breathing." The phenomenon requires that apparatus be made sufficiently large to permit adequate back-washing of the maximum volume. In general, adequate back-washing is insured by a free board which is at least 50% of this volume. Breathing also causes changes in the bed which are undesirable and may impose limitations on the use of the more efficient resins and on the design of the units for utilizing these resins.

According to this invention, there are obtained resins which exhibit a minimum of breathing by reacting 90 to 60 parts of a condensate of a methylol-forming phenol, formaldehyde, and an amine having at least one hydrogen atom on the amine nitrogen with 10 to 40 parts of a reducing carbohydrate, including sugars which reduce Fehling's solution and carbohydrates which yield reducing substances when heated in the reaction mixture, which is generally alkaline.

In the preparation of these compositions, there may be used a phenol which contains one hydroxyl group or more than one. The phenol may be monocyclic or polycyclic and may contain such a nuclear substituent as an alkyl, alkoxy, aryloxy, aryl, aralkyl, alicyclic, acyl, or other similar group. Typical phenols include phenol itself, various cresols, tert-butyl phenol, amyl phenol, octyl phenol, diisobutyl phenol, cyclohexyl phenol, phenyl phenol, diphenylol, resorcinol, catechol, catechol-type tannins, diphenylol dimethyl methane, diphenylol sulfone, the naphthols, alkyl phenol, etc. Any phenols having hydrogen available for substitution in positions ortho and/or para to the phenolic hydroxyl group may be used. Such phenols are generally called "methylol-forming" phenols.

Formaldehyde may be used in aqueous or solvent solution, may be added in the form of a gas, or may be obtained, at least in part, from methylenic compounds, including polymers, such as paraformaldehyde, hexamethylene tetramine, etc.

As an amine, there may be used any non-aromatic primary or secondary amine or an amine containing both primary and secondary groups. By the term "non-aromatic" there are designated those amines in which the amine nitrogen is not attached directly to a phenyl nucleus (as in aniline). Suitable non-aromatic amines having hydrogen attached to amine nitrogen include methylamine, dimethylamine, ethylamine, diethylamine, butylamine, dibutylamine, amylamine, octylamine, methyloctylamine, benzylmethylamine, methylbenzyl ethylamine, ethylene diamine, diethylenetriamine, triethylene tetramine, tetraethylene pentamine, hydroxyethyl ethylene diamine, propylene diamine, piperazine, morpholine, piperidine, pyrrolidine, cyclohexylamine, methyl cyclohexylamine, etc. There may be used mixtures of different non-aromatic reactive amines or mixtures of primary and secondary amines of the same general type, or commercial mixtures of a series of amines, such as the polyethylene polyamines. The latter are of particular importance in that they give resins of exceptionally high capacity for acidic constituents. There may also be used amines containing another functional group, such as amido or hydroxyl, as in N-amino-ethyl malonamide, or aminoethyl-aminoethanol. The amines may be used in their free form or as acid salts, such as the hydrochloride or acetate.

As a reducing carbohydrate, there may be used glucose, fructose, maltose, lactose, dextrins, invert sugar, soluble starch, converted starch, etc. These all react readily with the phenol-formaldehyde-amine condensate and all reduce Fehling's solution. Likewise, there may be used starch which yields reducing substances when heated in the reaction mixture. Thus, while starch by itself does not reduce Fehling's solution, it is converted to materials which do and which are, therefore, reactive. While the use of different carbohydrates may cause some variation in the nature of the final resin, any of the carbohydrates which evidence reducing power as determined by a test with Fehling's solution can be reacted with the condensates of methylol-forming phenols, formaldehyde, and non-aromatic amines having reactive hydrogen to produce resinous compositions which are less susceptible to changes in volume during absorption of acidic constituents and subsequent regeneration.

All of the reducing carbohydrates contain free aldehydo hydroxy or keto hydroxy groups. Carbohydrates lacking such groups are not reactive; although when these carbohydrates are readily broken down into simpler carbohydrates on heating in the reaction mixtures containing the amines, these simpler carbohydrates usually have these free reactive groups. For this reason, the starches are useful in the preparation of the resins of this invention.

In order to produce insoluble resins having a decreased degree of volume changes due to breathing, it is necessary to react the phenol-formaldehyde-amine condensate with at least one part of reducing carbohydrate for each nine parts of condensate. On the other hand, as many as about four parts of reducing carbohydrate may be reacted with about six parts of condensate before undesirable effects from solubility or loss of absorption capacity become troublesome. In the case of insoluble resinous compositions made with converted starch, when the composition is prepared with as much as 40% of its total weight in such starch, an insoluble resin begins to precipitate before the reaction is complete. This results in an inhomogeneous product. With dextrose, however, resins can be obtained which are entirely homogeneous even at such high proportions of reducing carbohydrate. At the same time, capacity begins to fall appreciably when larger percentages of carbohydrate have been used in the preparation of the resin. It is, therefore, desirable to prepare resins from 90 to 60 parts of the phenol-formaldehyde-amine condensate and 10 to 40 parts of reducing carbohydrate.

In preparing the resinous compositions of this invention, the phenol is dissolved or thoroughly suspended in water. An alkali, such as sodium hydroxide, may be used to accomplish this result. Sufficient formaldehyde is then added to form a methylol compound and the non-aromatic reactive amine added. Alternatively, the phenol and amine may be mixed and the formaldehyde carefully added to the mixture. The phenol-formaldehyde-amine condensate which is formed is then reacted with the carbohydrate by heating the aqueous mixture containing condensate and carbohydrate between about 80° and about 100° C. until a gel forms. Higher temperatures may be used if the reaction is conducted under pressure. The carbohydrate is preferably added as an aqueous slurry. After the condensate and carbohydrate have been reacted by heating, additional formaldehyde may be added. The gel which is obtained in the above reactions is then dried at a temperature above about 75° C. but below the point at which scorching of the resulting resin occurs. This upper temperature is that at which incipient decomposition may take place with loss of amine groups and, in general, is about 135° C. As the dried resins made with starch or converted starch fail to respond to tests for starch, it is evident that in the final resin all of such carbohydrate has been reacted. Also, repeated use in ion exchange applications does not remove carbohydrate and the nitrogen content remains unchanged.

The preparation of the resins of this invention is illustrated by the following examples:

*Example 1*

47 parts of phenol was taken up in 200 parts by weight of aqueous 37% formaldehyde which was maintained below 30° C. by cooling. To the solution of the thus formed methylol product there was slowly added 73 parts of triethylene tetramine, causing an immediate rise of temperature. An aqueous slurry containing 30 parts of starch was then added and the mixture maintained for three hours at 90°–100° C. 40 parts of aqueous formaldehyde was then added, the mixture again heated, and the condensate dried in an oven at 110° C. for 20 hours. The dried product was crushed to a 20 to 40 mesh size, washed with water, with a 5% solution of soda ash, and again with water. Tested for capacity with a solution containing 400 parts per million of sulfuric acid, it absorbed 250 milligrams per gram. It showed very little swelling during the absorption of acid and likewise showed very little contraction when regenerated with an alkali and washed free therefrom.

*Example 2*

57 parts of dihydroxyphenyl dimethyl methane was stirred into 250 parts of water containing 8 parts of sodium hydroxide. There was then slowly added 41 parts of 37% aqueous formaldehyde and the temperature maintained at about 50° C. for two hours. The reaction mixture was cooled to room temperature and thereto was added 95 parts of tetraethylene pentamine. When the initial reaction had subsided, 40 parts of tapioca starch in 100 parts of water was added and the mixture heated for two hours at 95° C. There was then added 82 parts of aqueous 37% formaldehyde. The resulting mixture was dried for 16 hours in an oven at 120° C. The dried material was crushed, screened to a 20/40 mesh product, washed with 5% soda ash solution, washed with water, and again dried.

Some of this resin was placed in a glass tube for study of absorption of acid and changes in volume. A solution containing 73 parts per million of hydrogen chloride and 400 parts per million of sulfuric acid was passed through the tube until the effluent became acid to methyl orange. The tube was then backwashed with water, regenerated with a dilute solution of sodium carbonate, and rinsed with water. Acid solution was again passed through the tube, and the resin regenerated through two more complete cycles. By this time, it was believed that equilibrium conditions had been set up in the tube and measurements of volume would be significant. The volume of the wet resin was determined as 65.2 cc. The acid solution was passed through and the bed was back-washed. The volume was then found to be 70.8 cc. The resin was then regenerated, reducing the volume to 67.0 cc. After thorough rinsing, the volume was found to be 64.5 cc. Thus, the increase in volume of the starch-modified resin was 8.6%, whereas an increase of 40% was found for a bed of resin made from the same phenol, formaldehyde and amine, but starch-free.

*Example 3*

The preparation of resin from diphenylol dimethyl methane, formaldehyde, and tetraethylene pentamine, as described in Example 2, was repeated with substitution of 20 parts of starch for the 40 parts used above. The finished resin thus contained 11% of starch. This product was tested against a solution containing 500 parts per million of hydrogen chloride and regenerated. The modified resin in its normal wet state had a capacity in column tests of 29,400 grains, as calcium carbonate, per cubic foot. The resin of Example 2, containing 20% starch, had a capacity, based also on the normal wet state, of 26,200 grains per cubic foot.

The breathing of the bed of resin was decreased 25% by the use of 11% of starch. In this connection, a resin made with 6% starch showed practically the same breathing as the resin made without starch, while resins made with 20% starch or more exhibited changes in volume during breathing of only 10% to 20% of the unmodified resins.

Based upon the active resin content of the above modified exchangers, the capacities are 37,400 grains of hydrochloric acid (as CaCO₃) for 22.6 pounds of active resin, for the resinous composition containing 11% starch, and 37,100 grains of hydrochloric acid for 22.6 pounds of active resin for the resinous composition containing 20% starch. When 22.6 pounds of unmodified resin is saturated with hydrochloric acid, it absorbs 35,000 grains of hydrochloric acid (as CaCO₃).

*Example 4*

To a solution of 8 parts of sodium hydroxide in 150 parts of water there was added 57 parts of diphenylol dimethyl methane, which was thoroughly stirred to form a uniform suspension. To this was slowly added 41 parts of a 37% aqueous formaldehyde solution, while the temperature of the reacting mixture was maintained below about 40° C. The mixture was warmed to about 50°–60° C. until the solution became clear and then cooled to 30° C., whereupon 75 parts of triethylene tetramine was slowly added. A solution of 40 parts of dextrose in 120 parts of water was combined with the mixture and the reaction system heated at 95° C. for an hour. It was then cooled to about 30° C. and 82 parts of 37% aqueous formaldehyde added while the temperature was maintained by cooling at below 33° C. When all the formaldehyde had been added, the temperature was carried to 95°–100° C. where a highly viscous solution formed which was poured into trays and placed in an oven at 115° C. for 24 hours. A hard, transparent, insoluble resin resulted, which was crushed, screened to 20/50 mesh, and washed with water. On a dry basis, the resin contained 15.56% nitrogen. When this resin absorbed hydrochloric acid, it swelled 16%. It recovered its original volume on regeneration and backwashing.

*Example 5*

A slurry of 40 parts of tapioca starch in 60 parts of water was treated with one-half part of a commercial diastase and heated to 70° C. for one-half hour, and then to 95° C., to inactivate the enzyme. This procedure yielded a relatively thin homogeneous paste. It was added to a solution of resinous material prepared by reacting 57 parts of diphenylol dimethyl methane with 45 parts of 37% aqueous formaldehyde in the presence of 150 parts of a 6% sodium hydroxide solution to form a methylol compound with 95 parts of tetraethylene pentamine. The mixture was heated at 95° C. for about two hours and cooled to about 40° C. 80 parts of formaldehyde was added, the reaction mixture heated again to about 95° C., and the resulting product placed in an oven at 120° C. for 16 hours. The dried resin was crushed, screened to 20/40 mesh, and washed with water. Tested by absorption technique in a column, this resin had a capacity of 23,400 grains of hydrogen chloride as calcium carbonate per cubic foot of wet resin at a regeneration ratio of 0.3 pound of soda ash as sodium chloride per kilograin anion adsorbed (as CaCO₃). The breathing of this resin was about half of that experienced with a similar resin which was unmodified with converted starch.

*Example 6*

The preparation of Example 5 was repeated with the exception that one part of diastase was used in place of the one half part used above to carry the conversion to an advanced state. The final resin was hard and transparent and had a capacity about the same as the resin prepared under Example 4. Its change in volume during absorption and regeneration was 12%.

While the carbohydrate-modified resins of this invention are particularly well adapted for the removal of acids from aqueous solutions, they are also useful for the absorption of acidic constituents, generally from fluids. Acid gases may be absorbed, acidic constituents absorbed from organic media, and anions split to varying degrees from salts.

By decreasing the volume changes due to breathing of resins capable of absorbing acidic constituents, many disadvantages of these resins are avoided or overcome. Since breathing occurs in all directions throughout a resin bed, excessive increases in volume cause high pressures to be created within the bed and strains in the resin particles, resulting in packing, in high head losses, and in more rapid disintegration of the resin particles. Since changes in volume are not always uniform throughout a resin bed, there frequently result channeling with premature break-through, loss in efficiency, and formation of conglomerates which are difficult to regenerate and to back-wash.

In addition to advantages occurring from overcoming these difficulties of operation, the reaction products of a phenol, formaldehyde, and a reactive non-aromatic amine, which are modified by reaction with a carbohydrate, permit savings in design and construction of the equipment in which they are used. Since the most common use is for absorbing acids, particularly after removal of cations by a hydrogen exchange resin, it is usually necessary to use acid-proof equipment, such as rubber-lined metal vessels, which are relatively expensive, or special alloys. Hence, any saving which can be made as a result of smaller size or more economical shapes is greatly to be desired. Such savings are possible with the carbohydrate-modified phenol-formaldehyde-amine anion exchange resins. A saving in volume permits installation of standard size units in buildings with standard height ceilings, since the large free board required in the case of unmodified resins is no longer necessary.

We claim:

1. In the process of preparing resins from a methylol-forming phenol, formaldehyde, and a non-aromatic amine having hydrogen available for substitution on the amino nitrogen, said resins being suitable for the absorption of acidic constituents from fluids, the improvement which comprises reacting 90 to 60 parts of the water-soluble condensation product of said phenol, formaldehyde and said amine at about 80° C. to about 100° C. in an aqueous dispersion with 10 to 40 parts of a carbohydrate selected from a member of the class consisting of carbohydrates which reduce Fehling's solution and carbohydrates which yield reducing substances when heated in an aqueous solution of the said water-soluble condensation product, continuing reacting same until an aqueous gel is formed, and heating said gel between about 75° C. and about 135° C. until a water-insoluble resin is formed.

2. In the process of preparing resins from a phenol having ortho- and para-hydrogen available for replacement, formaldehyde, and a non-aromatic amine having hydrogen available for substitution on the amino nitrogen, said resins being suitable for the absorption of acidic constituents from fluids, the improvement which comprises reacting 90 to 60 parts of the water-soluble condensation product of said phenol, formaldehyde and said amine at about 80° C. to about 100° C. in an aqueous dispersion with 10 to 40 parts of a carbohydrate selected from a member of the class consisting of carbohydrates which reduce Fehling's solution and carbohydrates which yield reducing substances when heated in an aqueous solution of the said water-soluble condensation product, continuing reacting same until an aqueous gel is formed, and heating said gel between about 75° C. and about 135° C. until a water-insoluble resin is formed.

3. In the process of preparing resins from a phenol having ortho- and para-hydrogen available for replacement, formaldehyde and an alkylene polyamine, said resins being suitable for the absorption of acidic constituents from fluids, the improvement which comprises reacting 90 to 60 parts of the water-soluble condensation product of said phenol, formaldehyde and said polyamine at about 80° C. to about 100° C. in an aqueous dispersion with 10 to 40 parts of a carbohydrate selected from a member of the class consisting of carbohydrates which reduce Fehling's solution and carbohydrates which yield reducing substances when heated in an aqueous solution of the said water-soluble condensation product, continuing reacting same until an aqueous gel is formed, and heating said gel between about 75° C. and about 135° C. until a water-insoluble resin is formed.

4. In the process of preparing resins from a phenol having ortho- and para-hydrogen available for replacement, formaldehyde, and a tetra-ethylene pentamine, said resins being suitable for the absorption of acidic constituents from fluids, the improvement which comprises reacting 90 to 60 parts of the water-soluble condensation product of said phonel, formaldehyde and said pent-amine at about 80° C. to about 100° C. in an aqueous dispersion with 10 to 40 parts of a carbohydrate selected from a member of the class consisting of carbohydrates which reduce Fehling's solution and carbohydrates which yield reducing substances when heated in an aqueous solution of the said water-soluble condensation product, continuing reacting same until an aqueous gel is formed, and heating said gel between about 70° C. and about 135° C. until a water-insoluble resin is formed.

5. In the process of preparing resins from a phenol having ortho- and para-hydrogen available for replacement, formaldehyde, and a tri-ethylene tetramine, said resins being suitable for the absorption of acidic constituents from fluids, the improvement which comprises reacting 90 to 60 parts of the water-soluble condensation product of said phenol, formaldehyde and said tetramine at about 80° C. to about 100° C. in an aqueous dispersion with 10 to 40 parts of a carbohydrate selected from a member of the class consisting of carbohydrates which reduce Fehling's solution and carbohydrates which yield reducing substances when heated in an aqueous solution of the said water-soluble condensation product, continuing reacting same until an aqueous gel is formed, and heating said gel between about 75° C. and about 135° C. until a water-insoluble resin is formed.

6. In the process of preparing resins from a phenol having ortho- and para-hydrogen available for replacement, formaldehyde, and a di-ethylene triamine, said resins being suitable for the absorption of acidic constituents from fluids, the improvement which comprises reacting 90 to 60 parts of the water-soluble condensation product of said phenol, formaldehyde and said triamine at about 80° C. to about 100° C. in an aqueous dispersion with 10 to 40 parts of a carbohydrate selected from a member of the class consisting of carbohydrates which reduce Fehling's solution and carbohydrates which yield reducing substances when heated in an aqueous solution of the said water-soluble condensation product, continuing reacting same until an aqueous gel is formed, and heating said gel between about 75° C. and about 135° C. until a water-insoluble resin is formed.

7. In the process of preparing resins from phenol, formaldehyde, and a polyethylene polyamine, said resins being suitable for the absorption of acidic constituents from fluids, the improvement which comprises reacting 90 to 60 parts of the water-soluble condensation product of said phenol, formaldehyde, and said polyamine at about 80° C. to about 100° C. in an aqueous dispersion with 10 to 40 parts of a carbohydrate selected from a member of the class consisting of carbohydrates which reduce Fehling's solution and carbohydrates which yield reducing substances when heated in an aqueous solution of the said water-soluble condensation product, continuing reacting same until an aqueous gel is formed, and heating said gel between about 750° C. and about 135° C. until a water-insoluble resin is formed.

8. In the process of preparing resins from diphenylol dimethyl methane, formaldehyde, and a polyethylene polyamine, said resins being suitable for the absorption of acidic constituents from fluids, the improvement which comprises reacting 90 to 60 parts of the water-soluble condensation product of said phenol, formaldehyde, and said polyamine at about 80° C. to about 100° C. in an aqueous dispersion with 10 to 40 parts of a carbohydrate selected from a member of the class consisting of carbohydrates which reduce Fehling's solution and carbohydrates which yield reducing substances when heated in an aqueous solution of the said water-soluble condensation product, continuing reacting same until an aqueous gel is formed, and heating said gel between about 75° C. and about 135° C. until a water-insoluble resin is formed.

9. The process of preparing resins having capacity for absorbing acidic constituents from fluids and having a reduced tendency to swell from such absorption, which comprises reacting in an aqueous system a phenol having ortho- and para-hydrogen available for replacement with formaldehyde to form a water-soluble methylol phenol, reacting said methylol phenol in aqueous solution with an alkylene polyamine to the stage of a water-soluble resinous condensate, reacting 90 to 60 parts of the said condensate at about 80° C. to about 100° C. in an aqueous dispersion with 10 to 40 parts of a carbohydrate selected from a member of the class consisting of carbohydrates which reduce Fehling's solution and carbohydrates which yield reducing substances when heated in an aqueous solution of the said resinous condensate, continuing reacting same until an aqueous gel is formed, and heat-hardening said gel below the scorching temperature thereof.

10. The process of preparing resins having capacity for absorbing acidic constituents from fluids and having a reduced tendency to swell from such absorption, which comprises reacting in an aqueous system phenol having ortho- and para-hydrogen available for replacement with formaldehyde to form a water-soluble methylol phenol, reacting said methylol phenol in aqueous solution with polyethylene polyamine to the stage of a water-soluble resinous condensate, reacting 90 to 60 parts of the said condensate at about 80° C. to about 100° C. in an aqueous dispersion with 10 to 40 parts of a carbohydrate selected from a member of the class consisting of carbohydrates which reduce Fehling's solution and carbohydrates which yield reducing substances when heated in an aqueous solution of the said resinous condensate, continuing reacting same until an aqueous gel is formed, and heat-hardening said gel below the scorching temperature thereof.

11. The process of claim 9 in which the carbohydrate is a starch.

12. The process of claim 10 in which the carbohydrate is a starch.

13. The product resulting by following the procedure of claim 1.

14. The product resulting by following the procedure of claim 3.

15. The product resulting from following the procedure of claim 7.

16. The product resulting from following the procedure of claim 8.

17. The product prepared according to the procedure of claim 9.

18. The product prepared according to the procedure of claim 10.

ROBERT J. MYERS.
JOHN W. EASTES.

---

CERTIFICATE OF CORRECTION.

Patent No. 2,362,086. November 7, 1944.

ROBERT J. MYERS, ET AL.

It is hereby certified that error appears in the printed specification of the above numbered patent requiring correction as follows: Page 4, first column, line 62, claim 4, for "70° C." read --75° C.--; and second column, line 43, claim 7, for "750° C." read --75° C.--; and that the said Letters Patent should be read with this correction therein that the same may conform to the record of the case in the Patent Office.

Signed and sealed this 6th day of February, A. D. 1945.

Leslie Frazer (Seal) Acting Commissioner of Patents.